US012282785B2

(12) United States Patent
Karbasi et al.

(10) Patent No.: US 12,282,785 B2
(45) Date of Patent: Apr. 22, 2025

(54) SYSTEM AND METHOD FOR PROVIDING ADVISORY NOTIFICATIONS TO MOBILE APPLICATIONS

(71) Applicant: The Toronto-Dominion Bank, Toronto (CA)

(72) Inventors: Maryam Karbasi, Toronto (CA); Vanessa Li, Toronto (CA); Peter Horvath, Toronto (CA); Matthew James Lee, Toronto (CA); Roozbeh Rokni, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 292 days.

(21) Appl. No.: 17/400,278

(22) Filed: Aug. 12, 2021

(65) Prior Publication Data

US 2023/0048437 A1 Feb. 16, 2023

(51) Int. Cl.
*G06F 9/451* (2018.01)
*G06N 20/00* (2019.01)
(Continued)

(52) U.S. Cl.
CPC ............ *G06F 9/453* (2018.02); *G06N 20/00* (2019.01); *H04L 51/046* (2013.01); *H04L 67/535* (2022.05)

(58) Field of Classification Search
CPC ....... G06F 9/453; H04L 67/535; G06N 20/00; G06Q 30/0215; G06Q 30/0224; G06Q 40/02; H04M 15/745; H04M 2215/0108
See application file for complete search history.

(56) References Cited

U.S. PATENT DOCUMENTS 8,452,706 B1 * 5/2013 Moadus ................. G06Q 40/02
705/40
8,694,901 B2 4/2014 Falchuk et al.
(Continued)

FOREIGN PATENT DOCUMENTS

EP 3054647 B1 3/2020

OTHER PUBLICATIONS

YouTube video by username Marble Jar Channel, "Start Budgeting with Mint," published Feb. 18, 2019, downloaded from https://www.youtube.com/watch?v=lwUnwiWDcOo (Year: 2019).*
(Continued)

*Primary Examiner* — Eric J Yoon
(74) *Attorney, Agent, or Firm* — CPST Intellectual Property Inc.; Brett J. Slaney

(57) ABSTRACT

A system and method are provided for providing advisory notifications to mobile applications. The method includes interfacing the server device with at least one endpoint within an enterprise system and storing a model trained by a machine learning engine to automatically determine advisory notifications relevant to client data sets stored by the endpoint(s) and/or the at least one endpoint. The method also includes determining a current state of a client account, using the model to determine an advisory notification for the client account based on the current state, referring to a set of rules to determine when to provide the advisory notification in the mobile application, and in what portion of the mobile application to display the notification; and sending the advisory notification via the communications module to a client device to display the advisory notification in the mobile application.

20 Claims, 11 Drawing Sheets

(51) Int. Cl.
    *H04L 51/046*     (2022.01)
    *H04L 67/50*     (2022.01)

(56) References Cited

U.S. PATENT DOCUMENTS

| | | |
|---|---|---|
| 10,143,421 B2 | 12/2018 | Weast et al. |
| 10,397,046 B1 | 8/2019 | Gupta et al. |
| 10,446,009 B2 | 10/2019 | Bourne, Jr. et al. |
| 10,528,228 B2 | 1/2020 | Sixeiro et al. |
| 10,686,740 B2 | 6/2020 | Alfaro et al. |
| 10,880,698 B1 | 12/2020 | Deora et al. |
| 10,897,641 B2 | 1/2021 | Ott et al. |
| 10,963,972 B1 | 3/2021 | Gabale et al. |
| 12,033,222 B1* | 7/2024 | Sivaraman ............ G06Q 50/01 |
| 2003/0043174 A1* | 3/2003 | Hinckley ............ G06F 3/04855 |
| | | 345/684 |
| 2009/0138386 A1* | 5/2009 | Wilson, Jr. ............ G06Q 40/02 |
| | | 705/14.69 |
| 2014/0359479 A1* | 12/2014 | Kamdar ............ G06Q 30/0241 |
| | | 715/752 |
| 2017/0185650 A1 | 6/2017 | Vainas et al. |
| 2017/0323345 A1* | 11/2017 | Flowers ................ H04W 4/02 |
| 2018/0129943 A1 | 5/2018 | La Placa |
| 2018/0143803 A1 | 5/2018 | La Placa |
| 2020/0097340 A1 | 3/2020 | Balik et al. |
| 2020/0380528 A1 | 12/2020 | Ganapathy et al. |
| 2020/0396328 A1 | 12/2020 | Salminen |
| 2021/0166318 A1* | 6/2021 | Tang ...................... G06Q 40/06 |
| 2022/0138592 A1* | 5/2022 | Horesh ................ G06N 5/022 |
| | | 706/46 |
| 2022/0277321 A1* | 9/2022 | Trevino Rojas ... G06Q 30/0201 |

OTHER PUBLICATIONS

"The artificial intelligence behind BBVA's virtual assistant, Blue"; https://www.bbva.com/en/the-artificial-intelligence-behind-bbvas-virtual-assistant-blue/; BBVA; Sep. 18, 2020; retrieved from the Internent on May 19, 2021.

\* cited by examiner

| Nudge Action | Day/Time/Trigger | Nudge Location |
|---|---|---|
| Overdraft alert | Balance X at day Y | Above account data |
| Use our service | 3rd party service use | Above account data |
| Savings goal | Balance X at day Y | Insights card |
| | | |
| | | |
| | | |
| | | |
| | | |

FIG. 3

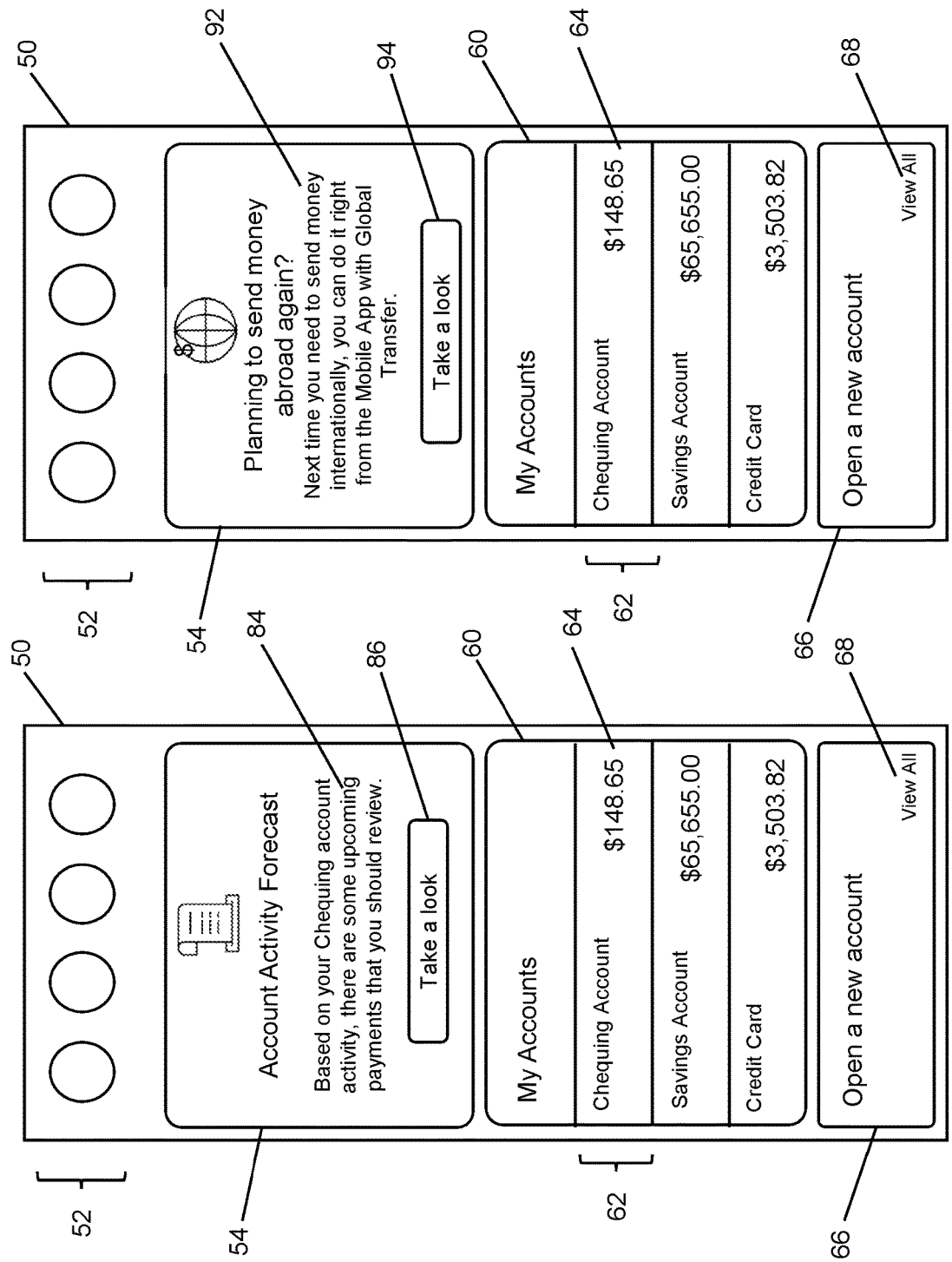

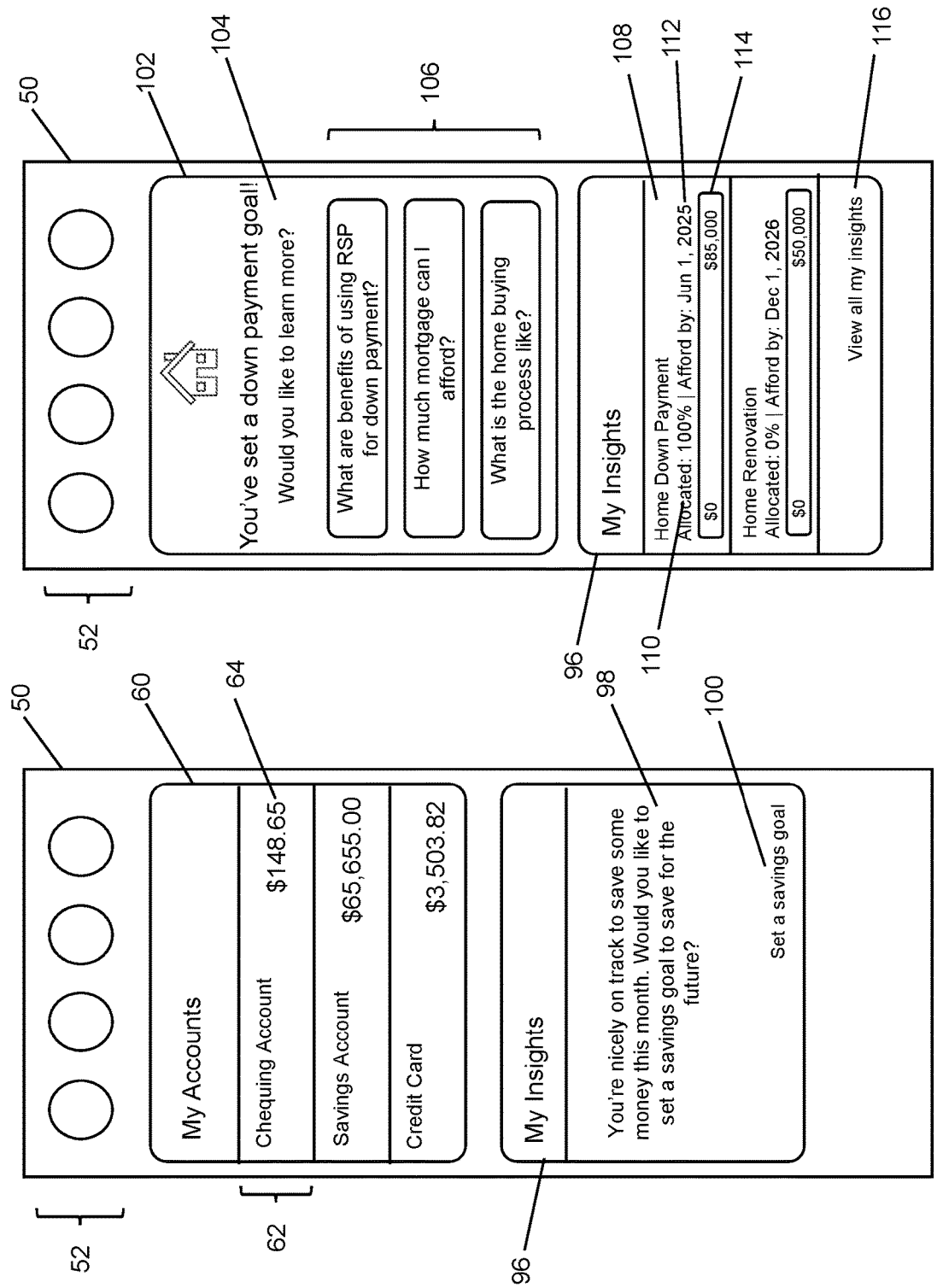

SYSTEM AND METHOD FOR PROVIDING ADVISORY NOTIFICATIONS TO MOBILE APPLICATIONS

TECHNICAL FIELD

The following relates generally to providing advisory notifications to mobile applications.

BACKGROUND

Mobile applications (also referred to as "apps") are continuing to increase in popularity with customers and clients and are therefore increasingly adopted by businesses, agencies and other organizations. With these increases in popularity and adoption, customers are found to expect such mobile apps to be able to do more and more for the user in order to get more out of their mobile experience. For example, when this is not the case, in some experiences, customers may be unable to find information or may not even be aware of the capabilities of a mobile app.

While the user can explore and experiment with features within the app and determine the features on their own, in many cases these users become frustrated and may seek assistance. For example, the user may contact a live agent using a telephone or chat channel to determine how to find and use certain features, which is burdensome to both the user and to the enterprise hosting and providing services via the mobile app.

Given the form factor and limited screen size of many mobile devices (such as smart phones and tables), while mobile apps are meant to be powerful and convenient (by taking advantage of increasingly convenient processing power and network connectivity), they should be simple to use with a clean and uncluttered interface. There exists a challenge in balancing these competing objectives while keeping the user engaged and using the mobile app as a primary point of contact. For example, too much generic information can be overwhelming to a user and too little information means the user may miss certain functionalities or features or be unable to figure out how to use the functionalities or features.

BRIEF DESCRIPTION OF THE DRAWINGS

Embodiments will now be described with reference to the appended drawings wherein:

FIG. 3 is an example of a rule set for nudge actions associated with advisory notifications.

FIG. 6 is an example of a graphical user interface for a mobile application in which an advisory notification is displayed for an upcoming payment management scenario.

FIG. 7 is an example of a graphical user interface for a mobile application in which an advisory notification is displayed for suggesting an alternative service.

FIG. 8 is an example of a graphical user interface for a mobile application in which an advisory notification is displayed for a savings goal suggestion.

FIG. 9 is an example of a graphical user interface for a mobile application in which an advisory notification is displayed subsequent to setting a savings goal.

DETAILED DESCRIPTION

Figure 1:
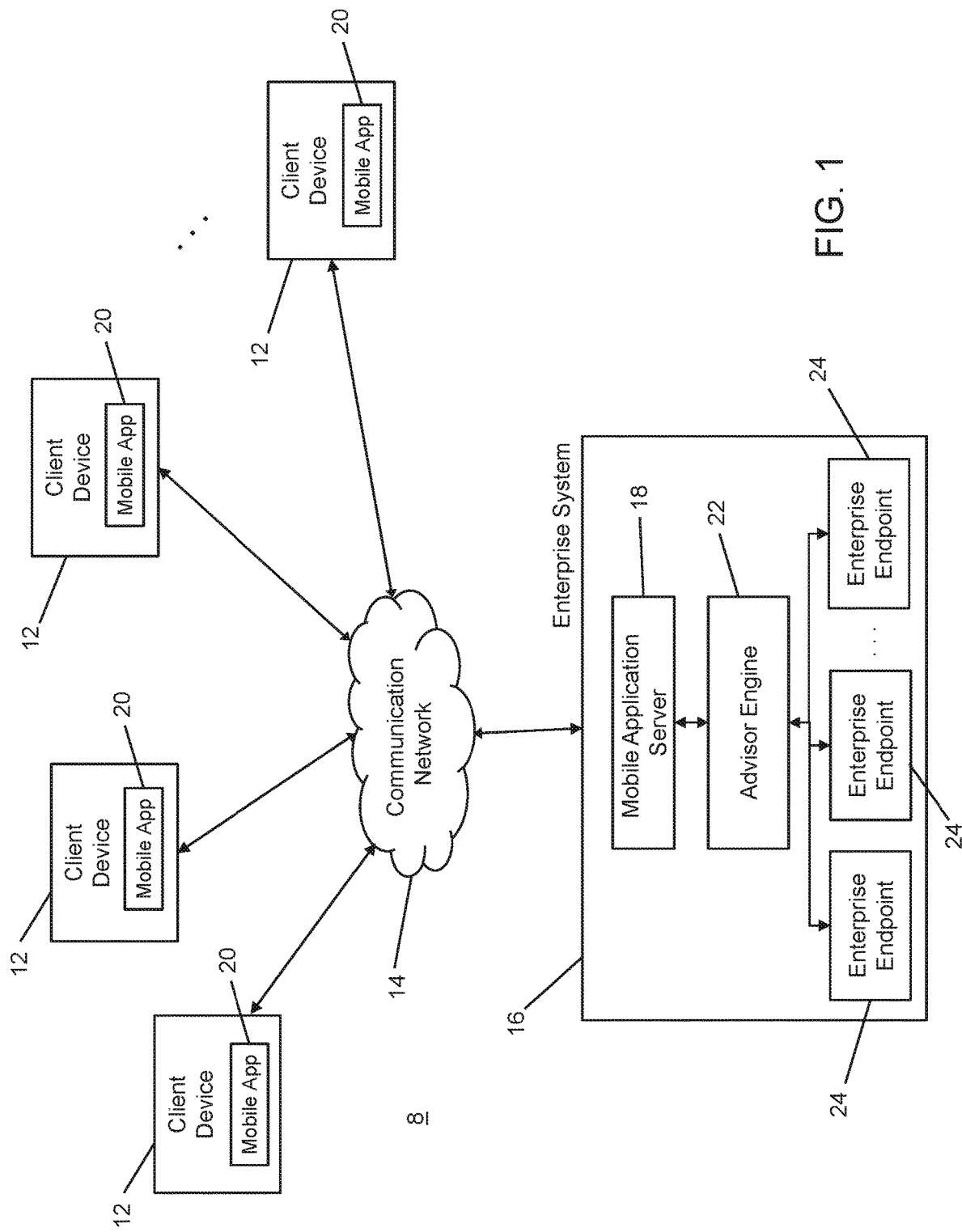
FIG. 1 is a schematic diagram of an example computing environment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

A "micro-advisor" is described herein that can be provided using an advisor engine as a layer beneath front-end user interfaces of mobile applications, to provide helpful reminders, notifications, and instructional information to users, which are based on context and current information associated with that user. The micro-advisor can provide "nudges". Such nudges can be considered strategically inserted reminders, alerts or notifications at an appropriate day/time, at a particular location within the mobile application, and with an appropriate frequency or cadence to ensure the user is getting the most out of their mobile app experience without overwhelming the user with too much information or information at inappropriate times. The micro-advisor can therefore eliminate at least some interactions with live agents and reduce the stresses on customer service channels.

The advisor engine can leverage artificial intelligence (AI)/machine learning (ML) tools and techniques to perform predictive or probabilistic analytics, or to build and refine models that are used to strategically select the day/time, location, and cadence of such advisory notifications.

It will be appreciated that while examples provided herein are directed to customer/client interactions in mobile applications provided by a financial institution environment, the principles discussed herein equally apply to other types of enterprises, for example, any customer service, e-learning, training, or other enterprise providing an interactive experience via a mobile application.

Certain example systems and methods described herein are able to determine appropriate advisory notifications and provide same in a mobile application. In one aspect, there is provided a server device for providing advisory notifications to mobile applications. The server device includes a processor, a communications module coupled to the processor, and a memory coupled to the processor. The memory stores computer executable instructions that when executed by the processor cause the processor to interface the server device, via the communications module, with at least one endpoint within an enterprise system, each endpoint storing client data sets corresponding to client accounts, each client account providing at least one feature in a mobile application for executing operations associated with the client account. The memory also stores computer executable instructions that when executed by the processor cause the processor to store a model trained by a machine learning engine to automatically determine advisory notifications relevant to the client data sets, the at least one endpoint, or both the client data sets and the at least one endpoint and determine a current state of a client account by communicating with the at least one endpoint via the communications module. The memory also stores computer executable instructions that when executed by the processor cause the processor to use the model to determine an advisory notification for the client account based on the current state; and refer to a set of rules to determine when to provide the advisory notification in the mobile application, and in what portion of the mobile application to display the notification. The memory also stores computer executable instructions that when executed by the processor cause the processor to send the advisory notification via the communications module to a client device to display the advisory notification in the mobile application.

In another aspect, there is provided a method of providing advisory notifications to mobile applications. The method includes interfacing the server device with at least one endpoint within an enterprise system, each endpoint storing client data sets corresponding to client accounts, each client account providing at least one feature in a mobile application for executing operations associated with the client account. The method also includes storing a model trained by a machine learning engine to automatically determine advisory notifications relevant to the client data sets, the at least one endpoint, or both the client data sets and the at least one endpoint. The method also includes determining a current state of a client account by communicating with the at least one endpoint and using the model to determine an advisory notification for the client account based on the current state. The method also includes referring to a set of rules to determine when to provide the advisory notification in the mobile application, and in what portion of the mobile application to display the notification; and sending the advisory notification via the communications module to a client device to display the advisory notification in the mobile application.

In another aspect, there is provided a non-transitory computer readable medium for providing advisory notification to mobile applications. The computer readable medium includes computer executable instructions for interfacing a server device with at least one endpoint within an enterprise system, each endpoint storing client data sets corresponding to client accounts, each client account providing at least one feature in a mobile application for executing operations associated with the client account. The computer readable medium also includes computer executable instructions for storing a model trained by a machine learning engine to automatically determine advisory notifications relevant to the client data sets, the at least one endpoint, or both the client data sets and the at least one endpoint. The computer readable medium also includes computer executable instructions for determining a current state of a client account by communicating with the at least one endpoint and using the model to determine an advisory notification for the client account based on the current state. The computer readable medium also includes computer executable instructions for referring to a set of rules to determine when to provide the advisory notification in the mobile application, and in what portion of the mobile application to display the notification; and sending the advisory notification via the communications module to a client device to display the advisory notification in the mobile application.

In certain example embodiments, the advisory notification can include at least one option to obtain more information, or to execute an action associated with the advisory notification. The method can further include determining that an input indicative of an interaction with the advisory notification has been received and obtaining the more information from one of the at least one endpoints or facilitating execution of the action by communicating with the mobile application or the at least one endpoint. Facilitating execution of the action can include communicating with a plurality of endpoints in the enterprise system.

In certain example embodiments, the advisory notification can be configured to be displayed in a dedicated portion of the mobile application. The mobile application can include a portion displaying information associated with a plurality of client accounts and the advisory notification is displayed in a notification card adjacent the plurality of accounts.

In certain example embodiments, the server device can be configured to interface the server device with a plurality of endpoints in the enterprise system to determine the advisory notification based on client data from a plurality of client accounts. The enterprise system can include a financial institution, the plurality of accounts can include multiple financial service accounts, and the advisory notification can include information based on client data pulled from client data sets in multiple endpoints within the financial institution. A first endpoint can provide client data indicative of a first service provided by a third party that was used by the client account and is available as a second service from a second endpoint within the enterprise system, the advisory notification providing a suggestion to use the second service provided by the second endpoint.

In certain example embodiments, the server device can be configured to receive updates from the at least one endpoint to the set of rules and update the set of rules.

In certain example embodiments, the set of rules can include at least one of: i) rules associated with the at least one endpoint, and ii) rules based on user preferences.

FIG. 1 illustrates an exemplary computing environment 8. In one aspect, the computing environment 8 may include an enterprise system 16 having an advisor engine 22, one or more client devices 12, and a communications network 14 connecting one or more components of the computing environment 8.

The enterprise system 16 may be associated with a financial institution system (e.g., for a commercial bank) that provides financial services accounts to users and processes financial transactions associated with those financial service accounts. This can include providing customer service options via a mobile application (app) 20 that can be downloaded to and used by users of the client devices 12. The enterprise system 16 includes a mobile application server 18 used to serve the mobile app 20 and the advisor engine 22 provides an interactive layer between the mobile application server 18 and one or more enterprise endpoints 24, which can each be associated with a department, line of business, service or other entity or sub-entity within or associated with the enterprise system 16. For example, in a financial institution system, one enterprise endpoint 24 can be associated with everyday banking while another endpoint 24 can be associated with credit accounts or investment accounts, mortgages, insurance, etc. While several details of the enterprise system 16 have been omitted for clarity of illustration, reference will be made to FIG. 12 below for additional details.

Client devices 12 may be associated with one or more users. Users may be referred to herein as customers, clients, correspondents, agents, or other entities that interact with the enterprise system 16 and/or advisor engine 22 (directly or indirectly). The computing environment 8 may include multiple client devices 12, each client device 12 being associated with a separate user or associated with one or more users. In certain embodiments, a user may operate client device 12 such that client device 12 performs one or more processes consistent with the disclosed embodiments. For example, the user may use client device 12 to engage and interface with a mobile or web-based banking application (i.e., the mobile app 20) which permits the advisor engine 22 to determine and provide advisory notifications to the mobile app 20 of a particular or particular ones of the client devices 12. In certain aspects, client device 12 can include, but is not limited to, a personal computer, a laptop computer, a tablet computer, a notebook computer, a hand-held computer, a personal digital assistant, a portable navigation device, a mobile phone, a wearable device, a gaming device, an embedded device, a smart phone, a virtual reality device, an augmented reality device, third party portals, an automated teller machine (ATM), and any additional or alternate computing device, and may be operable to transmit and receive data across communication network 14.

Communication network 14 may include a telephone network, cellular, and/or data communication network to connect different types of client devices 12. For example, the communication network 14 may include a private or public switched telephone network (PSTN), mobile network (e.g., code division multiple access (CDMA) network, global system for mobile communications (GSM) network, and/or any 3G, 4G, or 5G wireless carrier network, etc.), WiFi or other similar wireless network, and a private and/or public wide area network (e.g., the Internet).

In one embodiment, advisor engine 22 may be one or more computer systems configured to process and store information and execute software instructions to perform one or more processes consistent with the disclosed embodiments. In certain embodiments, although not required, advisor engine 22 may be associated with one or more business entities. In certain embodiments, the advisor engine 22 may represent or be part of any type of business entity. For example, advisor engine 22 may be a system associated with a commercial bank (e.g., enterprise system 16), a retailer, utility, government entity, educational institution, or some other type of business. The advisor engine 22 can also operate as a standalone entity (see, e.g., FIG. 2) that is configured to serve multiple business entities, e.g., to act as an agent therefor.

Continuing with FIG. 1, the advisor engine 22 and/or enterprise system 16 may also include a cryptographic server (not shown) for performing cryptographic operations and providing cryptographic services (e.g., authentication (via digital signatures), data protection (via encryption), etc.) to provide a secure interaction channel and interaction session, etc. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public and private keys in a PKI), and perform other cryptographic operations that are required or desired for particular applications of the advisor engine 22 and enterprise system 16. The cryptographic server may be used to protect sensitive data (e.g., financial data) and/or client data 30 and/or mobile app data 26 (see, e.g., FIG. 2) and/or data stored in a datastore storing nudge rules 34 (see also FIG. 2), by way of encryption for data protection, digital signatures or message digests for data integrity, and by using digital certificates to authenticate the identity of the users and client devices 12 with which the enterprise system 16 and/or advisor engine 22 communicates to inhibit data breaches by adversaries. It can be appreciated that various cryptographic mechanisms and protocols can be chosen and implemented to suit the constraints and requirements of the particular deployment of the advisor engine 22 or enterprise system 16 as is known in the art.

Figure 2:
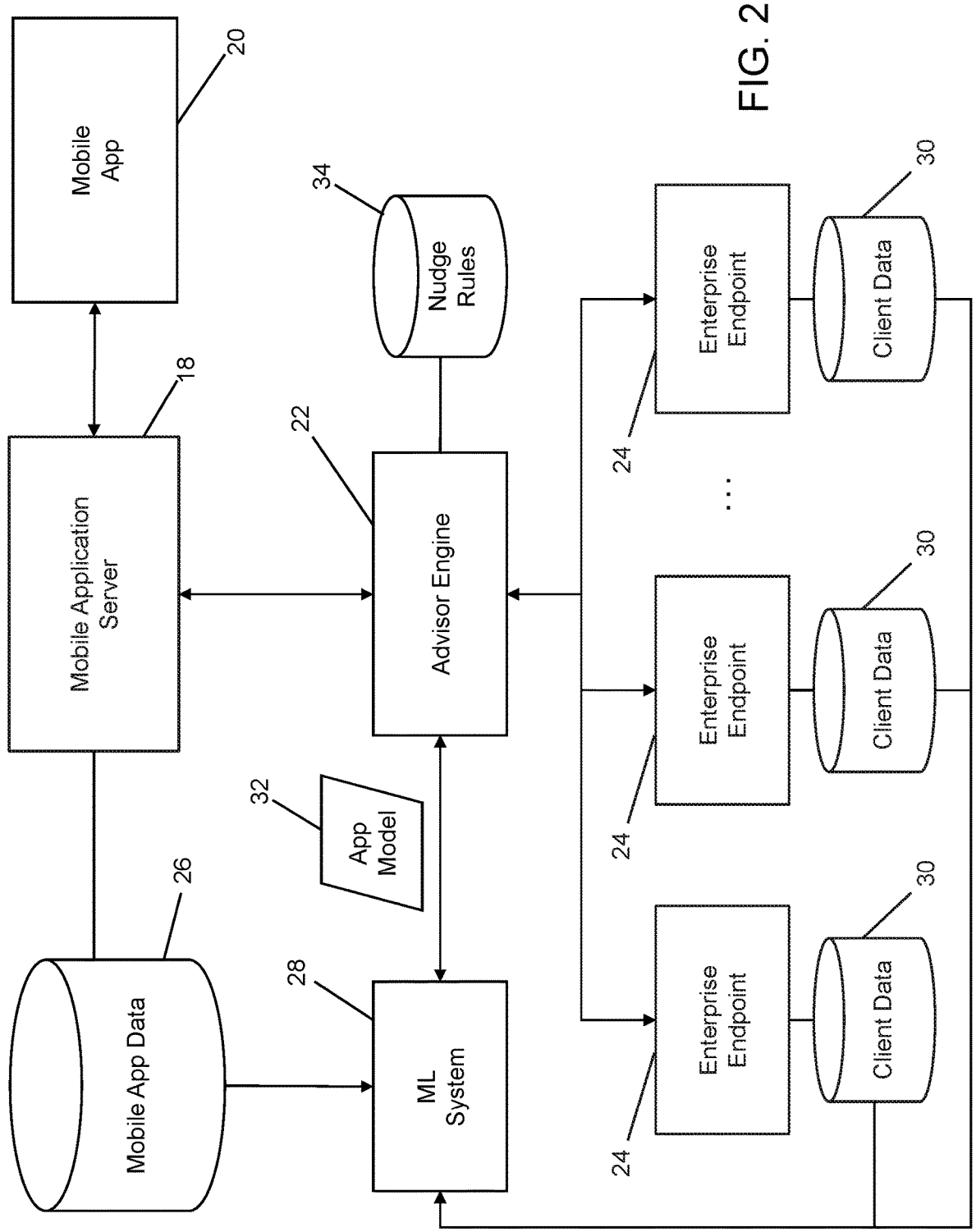
FIG. 2 is a schematic diagram of an advisory engine coupled to multiple enterprise endpoints and a mobile application server to provide advisory notifications to a mobile application.

Referring now to FIG. 2, the advisor engine 22 is shown as coupled to various components, entities, and services of, or associated with, the enterprise system 16 and mobile app 20 whether the advisor engine 22 is integrated into the enterprise system 16 or provided separately as a service therefor. The advisor engine 22 is positioned and operable between the mobile application server 18 and, in this example, a number of enterprise endpoints 24 to coordinate and deliver advisory notifications to the mobile app 20 that are associated with products, services, or features of the mobile app 20 that are handled or provided by certain enterprise endpoints 24. For example, an advisory notification can be generated by the advisor engine 22 based on account information pulled from multiple enterprise endpoints 24 to detect low balance or potential overdraft scenarios. In this example, each enterprise endpoint includes or has access to client data 30 associated with one or more accounts for users of client devices 12 running the mobile app 20. However, it can be appreciated that multiple endpoints 24 can have access to the same client data 30 in other configurations.

The mobile application server 18 includes or otherwise has access to a datastore for storing mobile app data 26, which can include data also stored as client data 30 by an enterprise endpoint 24 and/or provide a cache for same. The data 26, 30 may include any information or content, such as account data, personal data, conversation scripts or other contextual data (e.g., from call center interactions), metadata, tags, notes, files (e.g., PDFs), links (e.g., uniform resource locators (URLs)), images, videos, etc. that are created from or otherwise relate to interactions (e.g., conversations) between entities in the computing environment 8, in particular those made using client devices 12 via one or more communication channels available via the communication network 14 or other communication networks 14. As such, the data 26, 30 can be used by the advisor engine 22 in performing operations such as those described herein. The client data 30 may include both data associated with a user of a client device 12 that interacts with the enterprise system 16 and mobile app 20 (e.g., for participating in mobile banking and using customer service channels associated with such banking) and transaction history data that is captured and provided with a transaction entry, e.g., in the graphical user interface of a mobile or web-based banking application. The data associated with a user can include client profile data that may be mapped to corresponding financial data for that user and/or may include some of the financial data. Client profile data can include both data that is associated with a client as well as data that is associated with one or more user accounts for that client as recognized by the computing environment 8.

The data associated with a client may include, without limitation, demographic data (e.g., age, gender, income, location, etc.), preference data input by the client, and inferred data generated through machine learning, modeling, pattern matching, or other automated techniques. The client profile data may also include historical interactions and transactions associated with the enterprise system 16, e.g., login history, search history, communication logs, metadata, files, documents, etc.

It can be appreciated that the datastores used to store client data 30 and mobile app data 26 are shown as separate components from the enterprise endpoints 24 and mobile application server 18/enterprise system 16 for illustrative purposes only and may also be at least partially stored within a database, memory, or portion thereof within the enterprise system 16.

The advisor engine 22 includes or has access to a machine learning system 28, which can be employed to train one or more models 32 based on established logic and/or historical data concerning past delivery of advisory notifications, what is used to trigger such notifications, and at which day/time, location, cadence, etc. they are displayed. The machine learning system 28 can employ various machine learning techniques and can be used over time to continuously train and retrain models 26 based on new advisory notifications and client data 20 as discussed in greater detail below.

By integrating or coupling the advisor engine 22 to multiple enterprise endpoints 24 in the enterprise system 16, the advisor engine 22 can take into account different sets of client data 30 and indicators or flags detectable from that data 30 to provide coordinated advisory notifications to the mobile app 20 without overwhelming the user of the mobile app 20. In this way, a single advisory "hub" can be provided in an extensible and scalable manner to adapt to changing configurations and to accommodate new entities and services provided within the enterprise system 16 while maintaining consistency and familiarity of the advisory notifications for the user. The ML system 28 and app model 32 can be used to leverage detectable events, triggers, or flags and successful advisory notifications provided to other users and to retrain the app model 32 over time as experiences with the nudges provided by these advisory notifications are tracked. The app model 32 can be used by the advisor engine 22 to determine when advisory notifications may be appropriate based on the current state of an account or other characteristic of the client data 30 and a set of nudge rules 34 can be used to map certain triggers and/or days/times to actions and locations within the mobile app 20 in which to deliver the advisory notification. For example, as illustrated in examples described below, the mobile app 20 can be designed to include portions or panes of the user interface, also referred to herein as "nudge cards" or notification portions/areas/locations. In this way different actions can be associated with different triggers and/or nudge locations to prioritize and differentiate the urgency or importance of certain advisory notifications. The nudge rules 34 can also provide a flexible rule set data structure to incorporate both enterprise-imposed rules and user preferences. For example,
a user may wish to suppress advisory notifications in certain locations/areas of the mobile app 20 or have all advisory notifications displayed in the same area. Certain nudge actions can also be dismissed or ignored by the user to have them suppressed by the advisor engine 22.

FIG. 3 illustrates an example of a rule set for the nudge rules 34. In this example, the rule set includes a nudge rule 44 in each row, with a series of characteristics of each rule 44 in a series of corresponding columns. Each rule 44 in this example has a corresponding nudge action 38, i.e., the type of advisory notification that is to be displayed; a corresponding day/time/trigger 40, i.e., at least one criterion that dictates when the nudge action 38 is to be displayed. For example, the day/time/trigger 40 can specify a periodic reminder (e.g., once per week) or an asynchronous trigger such as a threshold balance, status event, user interaction, system event, administrator action/event, etc. Each rule 44 also includes a corresponding nudge location 42 which can be used to further customize the delivery of advisory notifications by specifying where in the mobile app 20 the notification is to be displayed. For example, financial account-related alerts that are deemed important or critical may be displayed in a launch window or pane, adjacent (e.g., above) account details, or both.

In FIG. 3, three examples are listed; and it can be appreciated that any number of rules 44 can be created, refined, removed, suppressed, or otherwise utilized on a per-service or per-client basis. The three examples include an overdraft alert, a "use our service" notification, and a savings goal option. The overdraft alert in this example is triggered by balance X at day Y, e.g., suggesting that a current balance near expected payments or withdrawals could lead to an overdraft scenario. The nudge location for this important notification is above the account data. The savings goal has a similar trigger but is deemed less important or otherwise associated with longer-term planning and is provided in an insights card as the nudge location 42. The use our service nudge action 38 is an example of a use for the advisor engine 22 to advantageously provide cross-coordination between endpoints 24 in the enterprise system 16, e.g., to detect in a credit card or chequing account that a $3^{rd}$ party service was used to perform a wire transfer that could have been done using one of the endpoints 24 in the enterprise system 16.

Figure 4:
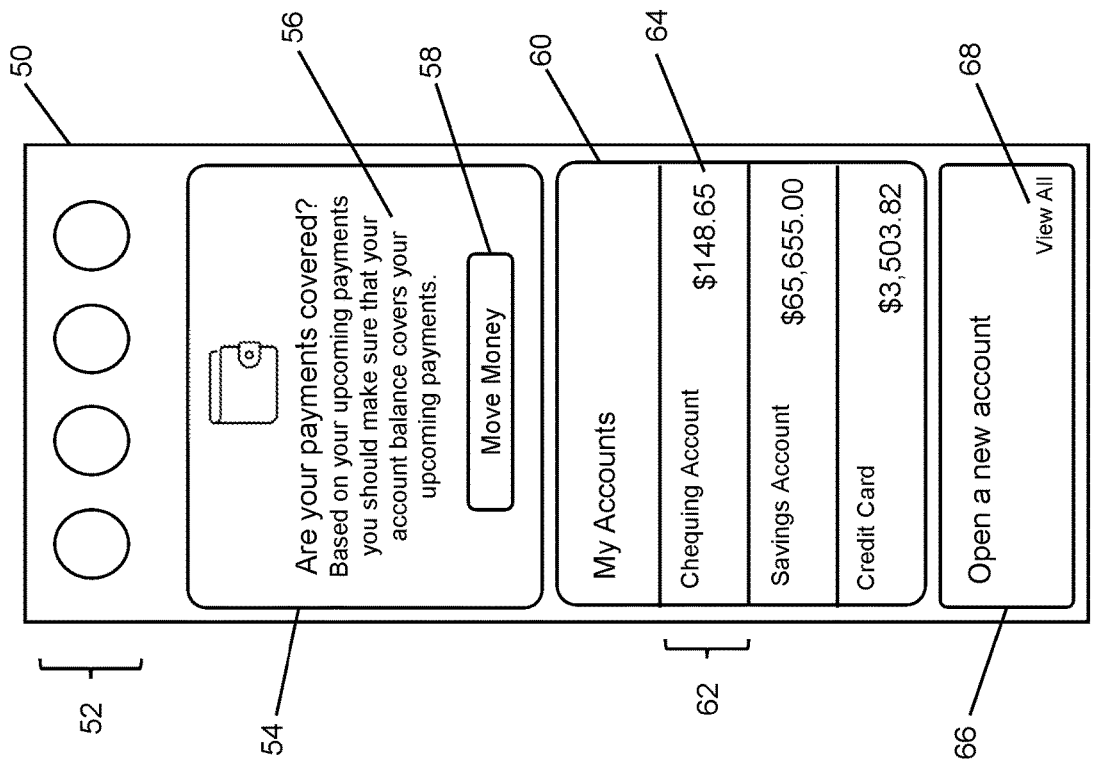
FIG. 4 is an example of a graphical user interface for a mobile application in which an advisory notification is displayed for an overdraft scenario.

Referring now to FIGS. 4 through 9 example use cases for having the advisory engine 22 determine and provide advisory notifications to the mobile app 20, are shown. FIG. 4 illustrates a mobile app user interface (UI) 50. The app UI 50 includes a banner portion 52 providing a number of options, an advisory notification portion 54, an accounts portion 60, and an "Open a new account" portion 66 which is an example of another portion of the UI 50 that can be scrolled to or otherwise accessed. The advisory notification portion 54 in this example is positioned at or near the top of the app UI 50 to be more noticeable to the user. In this example scenario, an overdraft alert is detected, which triggers an advisory notification 56. The advisory notification 56 in this example indicates that based on upcoming payments the user should make sure their account balance covers the upcoming payments. The account data and upcoming payments data can be obtained by the advisory engine 22 communicating with one or more of the enterprise endpoints 24. This can be done proactively by the advisory engine 22 or reactively by receiving periodic updates or batch data updates from the endpoints 24. The notification portion 54 is configured to include a Move Money option 58, which is an option or follow-up action that is associated with the advisory notification 56 and can be launched or otherwise linked into from the mobile app UI 50. By placing the advisory notification 54 above the accounts portion 60, the user can conveniently review their account balances 64 for corresponding accounts 62. In this example, the relatively high savings balance with a relatively low chequing balance can be observed and money moved from the savings account to the chequing account to bridge the potential overdraft scenario. It can be appreciated that the advisory notification 56 include additional information, such as when the overdraft scenario may occur and/or links or options to drill into more information to enable the user to plan accordingly. In this example, the app UI 50 also includes the new account option 66, which includes an option 68 to view all action items. The new account option 66 is an example of other mobile app features that can be positioned relative to other portions, including the advisory notification portion 54 to manage the delivery of information to the user in a controlled manner, e.g., to provide timely information without overwhelming the user.

Figure 5:
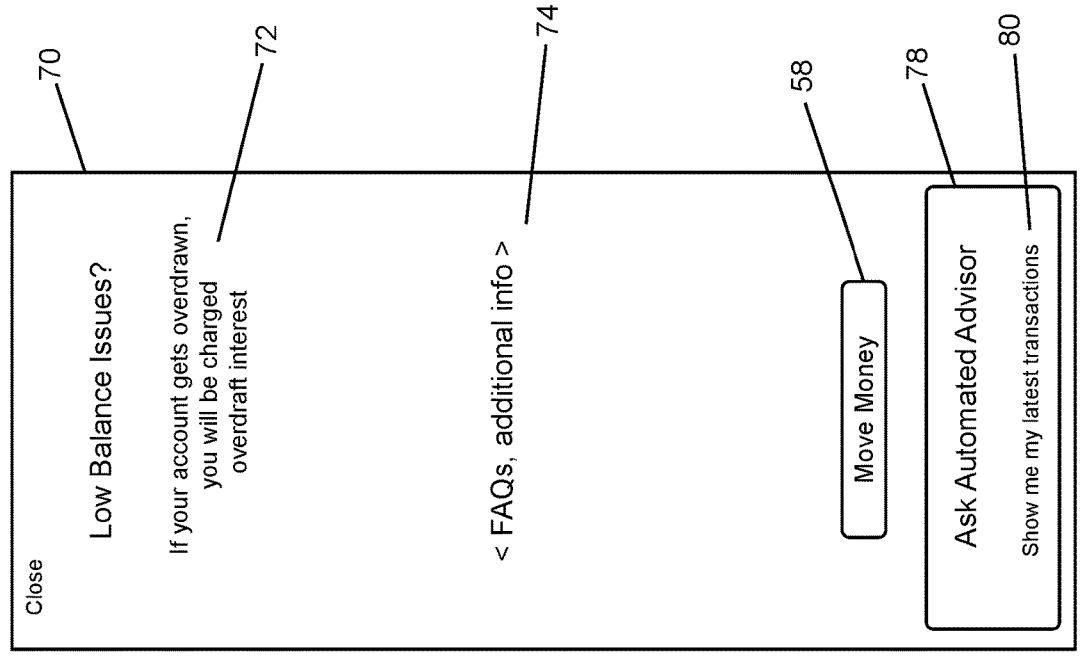
FIG. 5 is an example of a graphical user interface for obtaining more information and/or performing a follow-up action associated with a displayed advisory notification.

FIG. 5 illustrates an example of an additional information page 70 associated with the advisory notification 56. The information page 70 can be accessed, for example, by tapping or otherwise selecting the notification 56 or an option embedded therein (not shown). The information page 70 provides explanatory information 72 and additional information 74 such as frequently asked questions (FAQs) to assist the user in determining what they should do to address the alert. In this example, the Move Money option 58 is also provided within the information page 70 to enable the user to access this option to move funds as described above. The information page 70 can also be used to provide access to an automated service, chatbot, digital assistant, or live agent. For example, a micro-advisor can be provided by the advisor engine 22 to further assist the user in address events flagged in the advisory notification 56. In this example an automated advisor portion 78 can be selected to trigger an automated assistance service. Also shown is an option 80 to show additional information such as latest transactions. It can be appreciated that option 80 can also be displayed in the advisory notification portion 54, if desired. The advisor engine 22 and nudge rule sets 34 can be adapted to personalize and configure the advisory notification features exemplified herein. Moreover, the ML system 28 can be used to train the app model 32 to refine user preferences as the enterprise system 16 gathers experience data from witnessing and/or engaging in actual interactions with the system.

Referring now to FIG. 6, another scenario is illustrated in which an account activity forecast is provided in the advisory notification portion 54. In this scenario, an advisory notification 84 pertaining to activity in a specific account with automated or expected payments upcoming. For example, the user may have arranged automated bill payments and, based on historical activity in the user's chequing account (e.g., deposits versus withdrawals), the advisor engine 22 may determine that a bill payment should be adjusted or money moved (like in the scenario shown in FIG. 4) to address a potential shortfall. A Take a Look option 86 is provided in this example to provide the user with additional information. For example, the advisor engine 22 can determine that a monthly transfer to the savings account or an RSP is too high with expected bill payments and without further deposits and could be adjusted or skipped. The user, with this information, can adjust accordingly.

FIG. 7 illustrates another scenario in which the advisory notification portion 54 is used to display a suggested service. While not necessarily an urgent alert, the enterprise system 16 can use the advisor engine 22 to detect when third party services used by customers could be fulfilled by one of the enterprise endpoints 24 to cross-sell services or otherwise link services together. In this example, an advisory notification 92 flags for the user that a service they previously used to transfer funds internationally could have been done using a service of the enterprise system 16. The detection of such third party service usage can be done using various data analytics techniques such as by applying fuzzy logic to account transactions to detect, from available information such as vendor, address, etc., that a particular service was used. The advisory engine 22 can use the ML system 28 or another data analytics or data processing engine (not shown) to perform such analyses of client data 30 obtained from one or more of the enterprise endpoints 24.

Referring now to FIGS. 8 and 9, the advisor engine 22 can also be used to determine when and in what portion of the mobile app UI 50 to present additional options or features of the mobile app 20 of which the user may not necessarily be aware. In FIG. 8, an insights portion 96 is displayed below the accounts portion 60 and can be viewed in this example by scrolling down the page that was shown in FIG. 4. The insights portion 96 includes an advisory notification 98 indicative of a feature that the user can or has become eligible to use. In this example, the advisor engine 22 detects from data received or obtained from one or more enterprise endpoints 24 that the user should end up with sufficient savings to set a savings goal. A Set a Savings Goal option 100 is provided to enable the user to initiate such a feature.

FIG. 9 illustrates a savings goal portion 102 that is displayed in the app UI 50 after selecting the Set a savings goal option 100 shown in FIG. 8. The savings goal portion 102 includes a summary 104 of the type of savings goal, namely a down payment goal in this example and a number of options 106 that can be selected to determine additional information. The insights portion 96 in this example is now updated to include a list of recently created savings goals 108 with an allocation 110 and an "afford by" indicator 112. The goal 108 also includes a progress bar 114 to show the user's progress towards the goal. In the example shown in FIG. 9, 100% of the savings dedicated to the savings goals is allocated to the down payment goal 108 with an additional savings goal 108 associated with a home renovation set up but with 0% allocated. In this way, the user can set up multiple goals that can be achieved in parallel or sequentially as illustrated in this example (i.e., where the 100% allocation to down payment is to be achieved before the renovation savings begins) The insights portion 96 can also include a View all my insights option 116 to allow other insights to be displayed. For example, in addition to savings goals, the mobile app 20 may permit the user to set investing goals, etc.

Figure 10:
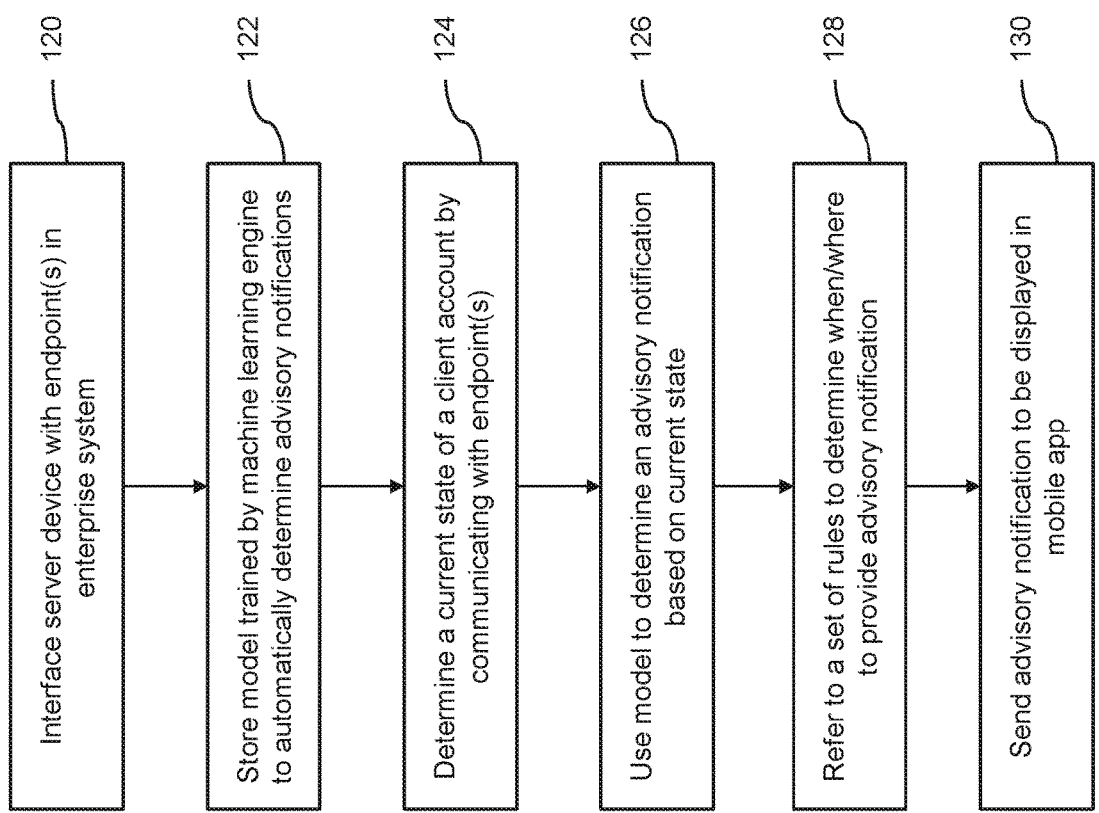
FIG. 10 is a flow diagram of an example of computer executable instructions for providing advisory notifications.

Referring now to FIG. 10, an example embodiment of computer executable instructions for providing advisory notifications 56, 84, 92, 98 is shown. At block 120, a server device associated with or used by the advisor engine 22 is interfaced with one or more endpoints 24 in the enterprise system 16. At block 122, the advisor engine 22 stores a model (e.g., app model 32) trained by the ML system 28 to automatically determine advisory notifications. For example, the app model 32 can be trained to detect patterns in spending activity or provide triggers or thresholds that can be associated with certain advisory notifications. At block 124, the advisor engine 22 determines a current state of a client account by communicating with the one or more endpoints 24. For example, the advisor engine 22 can proactively or reactively receive data from the endpoints 24 and apply the app model 32 to such data to determine if an advisory notification should be sent based on the current state at block 126. At block 128, the advisor engine 22 refers to a set of rules such as the nudge rules 34 to determine when and where to provide the advisory notification within the app UI 50. At block 130, the advisor engine 22 can provide or send the advisory notification or otherwise trigger same, via the mobile application server 18 and mobile app 20.

Figure 11:
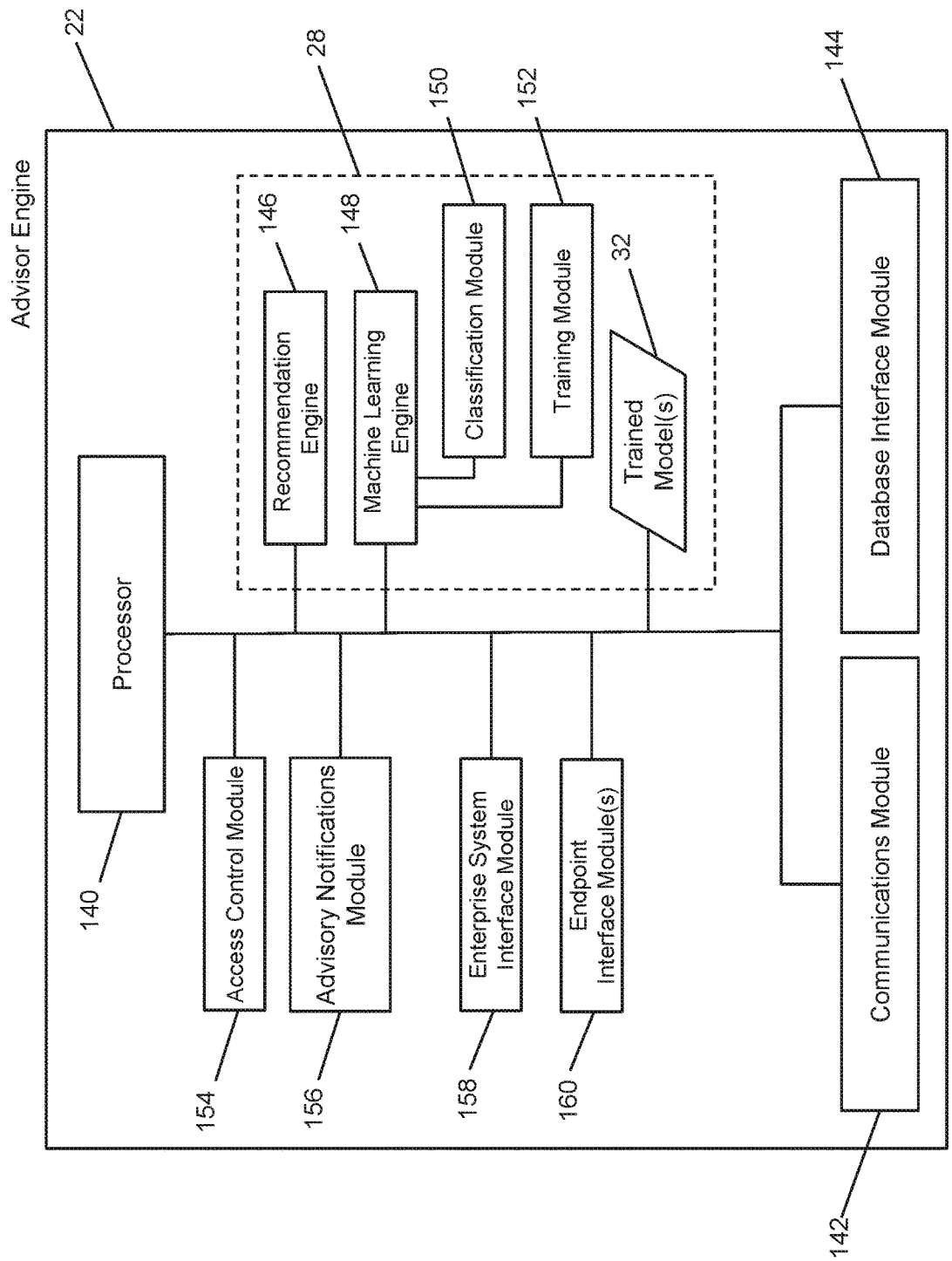
FIG. 11 is a block diagram of an example configuration of the advisor engine.

In FIG. 11, an example configuration of the advisor engine 22 is shown. In certain embodiments, the advisor engine 22 may include one or more processors 140, a communications module 142, and a database interface module 144 for interfacing with the data 26, 30 to retrieve, modify, and store (e.g., add) data. The advisor engine 22 can be embodied as one or more server devices and/or other computing device(s) configured to operate within computing environment 8. Communications module 142 enables the advisor engine 22 to communicate with one or more other components of the computing environment 8, such as client device 12 (or one of its components), via a bus or other communication network, such as the communication network 14. While not delineated in FIG. 11, the advisor engine 22 includes at least one memory or memory device that can include a tangible and non-transitory computer-readable medium having stored therein computer programs, sets of instructions, code, or data to be executed by processor 140. FIG. 11 illustrates examples of modules, tools and engines stored in memory on the advisor engine 22 and operated by the processor 140. It can be appreciated that any of the modules, tools, and engines shown in FIG. 11 may also be hosted externally and be available to the advisor engine 22, e.g., via the communications module 142. In the example embodiment shown in FIG. 11, the advisor engine 22 includes the machine learning system 28. The machine learning system 28 in this example includes a recommendation engine 146, a machine learning engine 148, a classification module 150, a training module 152, and the trained model 32. The advisor engine 22 also includes an access control module 154, an advisory notifications module 156, an enterprise system interface module 158, and one or more endpoint interface modules 160.

The recommendation engine 146 is used by the advisor engine 22 to generate one or more recommendations for advisory notifications for the advisor engine 22. It may be noted that a recommendation as used herein may refer to a prediction, suggestion, inference, association or other recommended identifier that can be used to generate a notification, message, content, or a combination thereof that provides data and/or information for preparing an advisory notification. The recommendation engine 146 can access the data 26, 30 via the databases interface module 144 and apply one or more inference processes to generate the recommendation(s). The recommendation engine 146 may utilize or otherwise interface with the machine learning engine 148 to both classify data currently being analyzed to generate a suggestion or recommendation, and to train classifiers using data that is continually being processed and accumulated by the advisor engine 22 (e.g., advisory notifications and triggers and/or interactions therewith, stored over time). That is, the recommendation engine 146 can learn when and where to provide advisory notifications and for which endpoint(s) 24 and generate and improve upon one or more trained models 32 over time.

The machine learning engine 148 may also perform operations that classify account data and/or other client data 30 in accordance with corresponding classifications parameters, e.g., based on an application of one or more machine learning algorithms to each of the groups of data 26, 30. The machine learning algorithms may include, but are not limited to, a one-dimensional, convolutional neural network model (e.g., implemented using a corresponding neural network library, such as Keras®), and the one or more machine learning algorithms may be trained against, and adaptively improved, using elements of previously classified profile content identifying suitable matches between content identified and potential actions to be executed. Subsequent to classifying the conversation or contextual content, the recommendation engine 146 may further process each element of the content to identify, and extract, a value characterizing the corresponding one of the classification parameters, e.g., based on an application of one or more additional machine learning algorithms to each of the elements of the content. By way of example, the additional machine learning algorithms may include, but are not limited to, an adaptive NLP algorithm that, among other things, predicts starting and ending indices of a candidate parameter value within each element of the content, extracts the candidate parameter value in accordance with the predicted indices, and computes a confidence score for the candidate parameter value that reflects a probability that the candidate parameter value accurately represents the corresponding classification parameter. As described herein, the one or more additional machine learning algorithms may be trained against, and adaptively improved using, the locally maintained elements of previously classified content. Classification parameters may be stored and maintained using the classification module 150, and training data may be stored and maintained using the training module 152.

The trained model 32 may also be created, stored, refined, updated, re-trained, and referenced by the advisor engine 22 and/or enterprise system 16 to determine associations between users, transactions, interactions, conversations, third party data, or other contextual content. Such associations can be used to generate "people like you" recommendations or suggestions for advisory notifications based on what has worked or been done with other users.

In some instances, classification data stored in the classification module 150 may identify one or more parameters, e.g., "classification" parameters, that facilitate a classification of corresponding elements or groups of recognized content based on any of the exemplary machine learning algorithms or processes described herein. The one or more classification parameters may correspond to parameters that can indicate an affinity or compatibility between the data 26, 30 and certain potential actions (e.g., as set out in the nudge rules 34).

In some instances, the additional, or alternate, machine learning algorithms may include one or more adaptive, NLP algorithms capable of parsing each of the classified portions of the profile content and predicting a starting and ending index of the candidate parameter value within each of the classified portions. Examples of the adaptive, NLP algorithms include, but are not limited to, NLP models that leverage machine learning processes or artificial neural network processes, such as a named entity recognition model implemented using a SpaCy® library.

Examples of these adaptive, machine learning processes include, but are not limited to, one or more artificial, neural network models, such as a one-dimensional, convolutional neural network model, e.g., implemented using a corresponding neural network library, such as Keras®. In some instances, the one-dimensional, convolutional neural network model may implement one or more classifier functions or processes, such a Softmax® classifier, capable of predicting an association between an element of conversation or context data (e.g., something indicative of an action required by the user related to one of their accounts) and a single classification parameter and additionally, or alternatively, multiple classification parameters.

Based on the output of the one or more machine learning algorithms or processes, such as the one-dimensional, convolutional neural network model described herein, machine learning engine 148 may perform operations that classify each of the discrete elements of conversation or context content as a corresponding one of the classification parameters, e.g., as obtained from classification data stored by the classification module 150.

The outputs of the machine learning algorithms or processes may then be used by the recommendation engine 146 to generate one or more suggested actions that can be presented to the advisory notifications module 156 to generate a suitable advisory notification that is delivered according to the nudge rules 34.

Referring again to FIG. 11, the access control module 154 may be used to apply a hierarchy of permission levels or otherwise apply predetermined criteria to determine what client data 30 can be shared with which entity in the computing environment 8. For example, the advisor engine 22 may have been granted access to certain sensitive client data 30 or financial data for a user, which is associated with a certain client device 12 in the computing environment 8. Similarly, certain client profile data stored in the client data 30 may include potentially sensitive information such as age, date of birth, or nationality, which may not necessarily be needed by the advisor engine 22 to execute certain actions. As such, the access control module 154 can be used to control the sharing of certain client profile data or other client data 30 and/or content stored in the datastores for app data 26 and/or client data 30 and/or other financial data based on a type of client/user, a permission or preference, or any other restriction imposed by the computing environment 8 or application in which the advisor engine 22 is used.

The advisor engine 22 may also include the advisory notifications module 156 configured to send alerts or notifications via appropriate channels via the mobile application server 18, based on actions determined appropriate by the advisor engine 22. The advisor engine 22 may also include one or more endpoint interface modules 160 to enable the advisor engine 22 to integrate with and communicate with the enterprise endpoints 24 as discussed above. The interface module(s) 160 can take the form of an application programming interface (API), software development kit (SDK) or any other software, plug-in, agent, or tool that allows the advisor engine 22 to be integrated with or within an application associated with another entity.

The advisor engine 22 may also include an enterprise system interface module 158 to provide a graphical user interface (GUI) or API connectivity to communicate with the enterprise system 16 to obtain client data 30 and financial data for a certain user. It can be appreciated that the enterprise system interface module 158 may also provide a web browser-based interface, an application or "app" interface, a machine language interface, etc.

Figure 12:
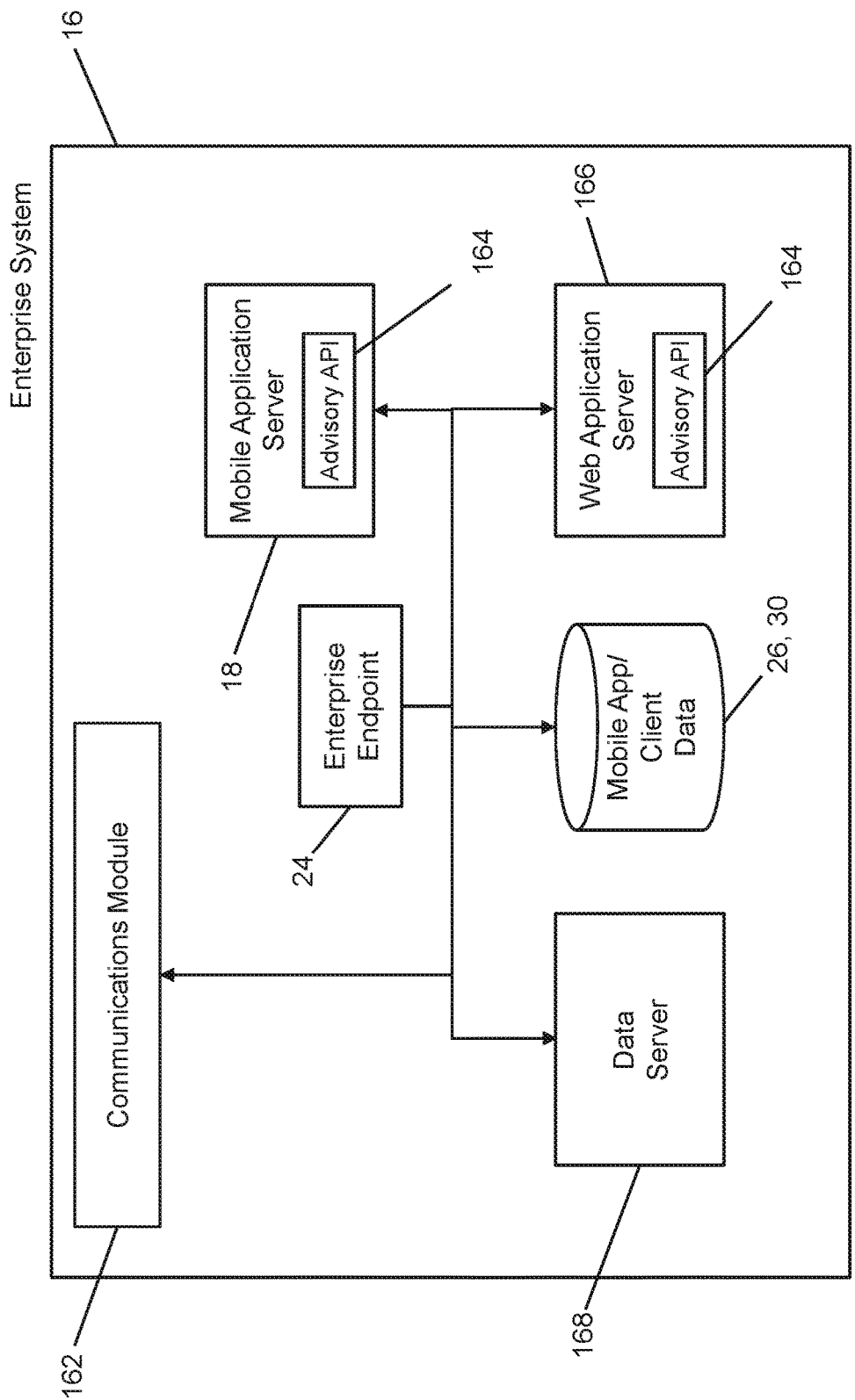
FIG. 12 is a block diagram of an example configuration of an enterprise system.

In FIG. 12, an example configuration of the enterprise system 16 is shown. The enterprise system 16 includes a communications module 162 that enables the enterprise system 16 to communicate with one or more other components of the computing environment 8, such as client device 12 (or one of its components) or advisor engine 22, via a bus or other communication network, such as the communication network 14. While not delineated in FIG. 12, the system 16 includes at least one memory or memory device that can include a tangible and non-transitory computer-readable medium having stored therein computer programs, sets of instructions, code, or data to be executed by one or more processors (not shown for clarity of illustration). FIG. 12 illustrates examples of servers and datastores/databases operable within the system 16. It can be appreciated that any of the components shown in FIG. 12 may also be hosted externally and be available to the system 16. e.g., via the communications module 162. In the example embodiment shown in FIG. 12, the enterprise system 16 includes one or more servers to provide access to the client data app data 26 and/or client data 30 to the advisor engine 22 via or on behalf of the enterprise endpoint(s) 24 to enable the advisor engine 22 to enable advisory notifications to be created and for advisory notifications to be learned, suggested and/or recommended to the user. Exemplary servers include the mobile application server 18, a web application server 166 and a data server 168. Although not shown in FIG. 12, as noted above, the system 16 may also include a cryptographic server for performing cryptographic operations and providing cryptographic services. The cryptographic server can also be configured to communicate and operate with a cryptographic infrastructure. The enterprise system 16 may also include one or more data storages for storing and providing data for use in such services, such as data storage for storing mobile app data 26 and/or client data 30.

Mobile application server 18 supports interactions with the mobile app 20 installed on client device 12. Mobile application server 18 can access other resources of the enterprise system 16 to carry out requests made by, and to provide content and data to, mobile app 20 on client device 12. In certain example embodiments, mobile application server 18 supports a mobile banking application to provide payments from one or more accounts of user, among other things. As shown in FIG. 12, the mobile application server 18 can include an advisory API 164 which enables the mobile app 20 to integrate or otherwise coordinate or work with the advisor engine 22 to provide an advisory notification functionality. For example, the advisory API 164 can communicate with the advisor engine 22 via the enterprise system integration module 158 in the advisor engine 22 (see FIG. 11).

Web application server 166 supports interactions using a website accessed by a web browser application 180 (see FIG. 13) running on the client device 12. It can be appreciated that the mobile application server 18 and the web application server 166 can provide different front ends for the same application, that is, the mobile (app) and web (browser) versions of the same application 20. For example, the enterprise system 16 may provide a banking application that be accessed via a smartphone or tablet app while also being accessible via a browser on any browser-enabled device. As shown in FIG. 12, the web application server 166 may also include an advisory API 164 to enable the web application to integrate or otherwise coordinate or work with the advisor engine 22 to provide advisory notification functionality to a web version of the mobile app 20, if desired.

The client data 30 may include financial data, which can be associated with users of the client devices 12 (e.g., customers of the financial institution). The financial data may include any data related to or derived from financial values or metrics associated with customers of a financial institution associated with the enterprise system 16, for example, account balances, transaction histories, line of credit available, credit scores, mortgage balances, affordability metrics, investment account balances, investment values and types, among many others. Other metrics can be associated with the financial data, such as financial health data that is indicative of the financial health of the users of the client devices 12. As indicated above, it can be appreciated that the client data 30 shown in FIG. 2 may be part of the financial data held by the enterprise system 16 and is shown separately for ease of illustration and ease of reference herein. An enterprise endpoint 24 is shown in FIG. 12 for illustrative purposes. It can be appreciated that any one or more endpoints 24 may be located within the bounds of the enterprise system 16 as shown in FIG. 12 or may be located elsewhere and communicable therewith, as shown generally in FIG. 2.

Figure 13:
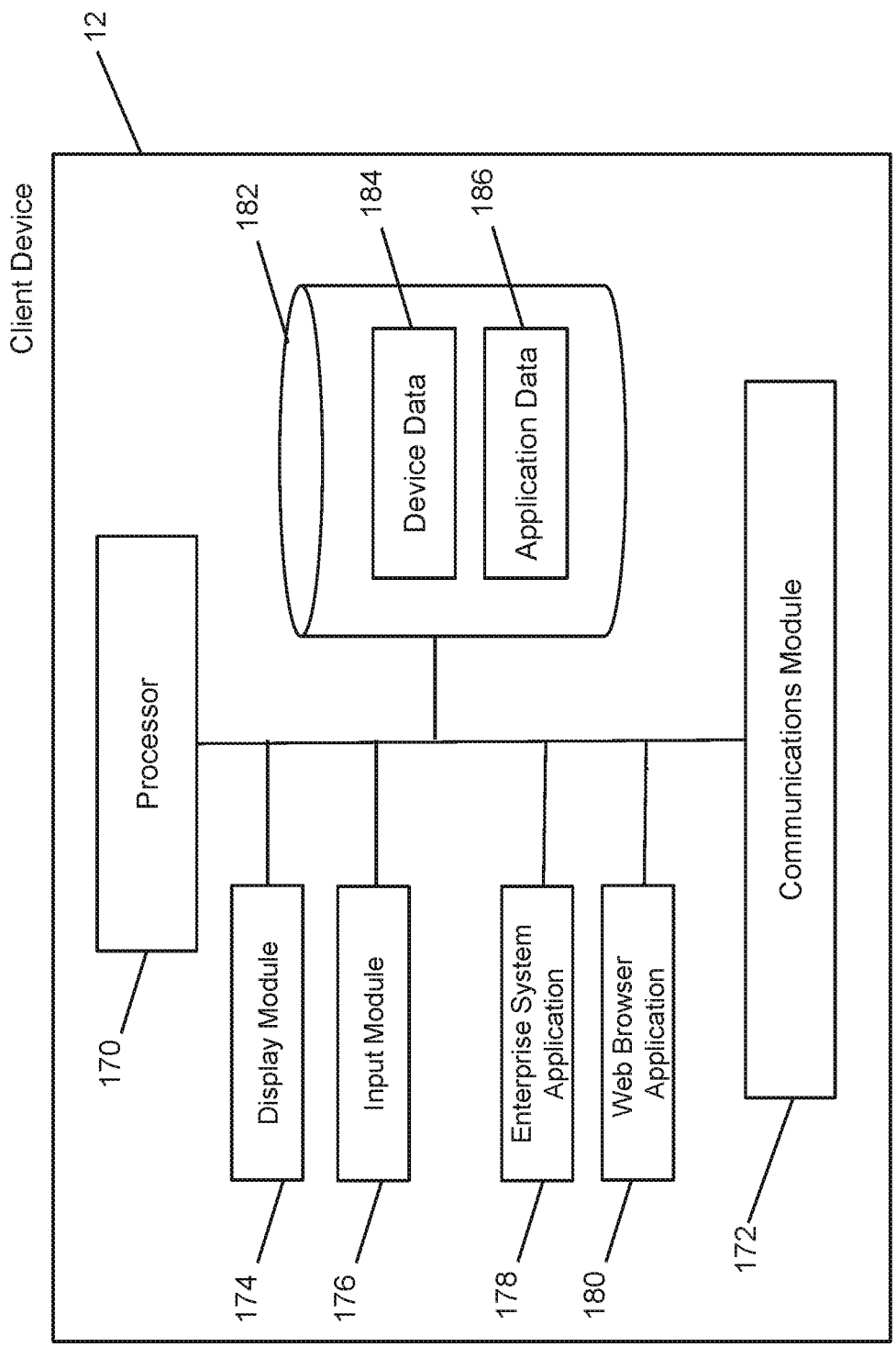
FIG. 13 is a block diagram of an example configuration of a client computing device associated with a user, customer, or client.

In FIG. 13, an example configuration of the client device 12 is shown. In certain embodiments, the client device 12 may include one or more processors 170, a communications module 172, and a data store 182 storing device data 184 and application data 186. Communications module 172 enables the client device 12 to communicate with one or more other components of the computing environment 8, such as advisor engine 22 or enterprise system 16, via a bus or other communication network, such as the communication network 14. While not delineated in FIG. 13, the client device 12 includes at least one memory or memory device that can include a tangible and non-transitory computer-readable medium having stored therein computer programs, sets of instructions, code, or data to be executed by processor 170. FIG. 13 illustrates examples of modules and applications stored in memory on the client device 12 and operated by the processor 170. It can be appreciated that any of the modules and applications shown in FIG. 13 may also be hosted externally and be available to the client device 12, e.g., via the communications module 172.

In the example embodiment shown in RC. 13, the client device 12 includes a display module 174 for rendering GUIs and other visual outputs on a display device such as a display screen, and an input module 176 for processing user or other inputs received at the client device 12, e.g., via a touchscreen, input button, transceiver, microphone, keyboard, etc. As noted above, the client device 12 can use such an input module 176 to gather inputs that are indicative of behavioral cues, facial recognition, presence detection, etc. The client device 12 may include an enterprise system application 178 provided by the enterprise system 16, e.g., for performing mobile banking operations. The client device 12 in this example embodiment also includes a web browser application 180 for accessing Internet-based content, e.g., via a mobile or traditional website. The data store 182 may be used to store device data 184, such as, but not limited to, an IP address or a MAC address that uniquely identifies client device 12 within environment 8. The data store 182 may also be used to store application data 186, such as, but not limited to, login credentials, user preferences, cryptographic data (e.g., cryptographic keys), etc.

It will be appreciated that only certain modules, applications, tools and engines are shown in FIGS. 2 and 11 to 13 for ease of illustration and various other components would be provided and utilized by the advisor engine 22, enterprise system 16, and client device 12, as is known in the art.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of any of the servers or other devices in advisor engine 22 or enterprise system 16, or client device 12, or accessible or connectable thereto. Any application or module herein described may be implemented using computer readable/executable instructions that may be stored or otherwise held by such computer readable media.

Figure 14:
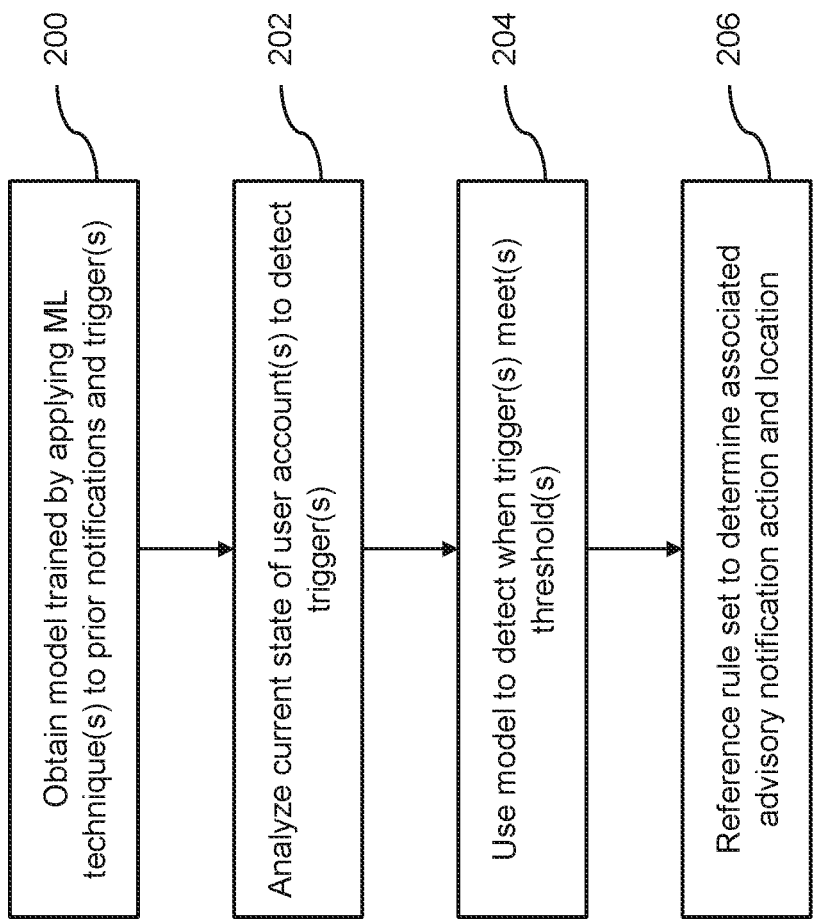
FIG. 14 is a flow diagram of an example of computer executable instructions for applying machine learning models to prior notification triggers to analyze current account states for generating advisory notifications.

Referring now to FIG. 14, an example embodiment of computer executable instructions for applying machine learning models trained on prior advisory notifications and interactions related thereto to a current state of a user's account(s) is shown. As noted above, the machine learning system 28 can be used to train app models 32 based on historical data pertaining to advisory notifications and interactions by users with such notifications. At block 200, the advisor engine 22 obtains a model 32 trained by applying machine leaning techniques to prior advisory notifications and triggers for providing such notifications. That is, the model 32 can be trained to appropriately detect when an advisory notification should be displayed so as to not overwhelm or annoy a user. The model 32 can also be built using data indicative of the effectiveness of certain triggers as well as interactions post notification that would be indicative of the effectiveness of the particular notification and/or its cadence, location, etc. With the model 32 being available to the advisor engine 22, the advisor engine 22, at block 202, analyzes the current state of a user's account(s) to detect one or more triggers. For example, the advisor engine 22 can receive, retrieve or otherwise obtain client data 30 from one or more of the enterprise endpoints 24 periodically to determine if any of the data maps to a trigger at block 204. Then, at block 206, the advisor engine 22 can reference the rule set in the nudge rules 34 to determine the associated action, location in the mobile app 20 and cadence of when to display the notification. For example, the mobile app 20 or user preferences can dictate that a new notification should be displayed each time the mobile app 20 is opened or daily, weekly, etc.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A system for providing advisory notifications to mobile applications, the system comprising:

at least one processor;

at least one communications module, each coupled to one of the at least one processor; and at least one memory, each coupled to one of the at least one processor, the at least one memory storing computer executable instructions that when executed by the at least one processor cause the at least one processor to:

provide a plurality of endpoints each associated with a sub-entity within an enterprise system of a financial institution that provides financial transactions, each endpoint storing client data sets corresponding to client accounts, each client account providing at least one feature in a mobile application for executing financial transactions associated with respective client accounts via corresponding enterprise endpoints of the plurality of enterprise endpoints;

provide a model in an adviser engine server positioned and operable between a mobile application server associated with the mobile application and the plurality of enterprise endpoints, the model being a machine learning model trained by a machine learning engine to automatically determine advisory notifications relevant to the client data sets, the plurality of endpoints, or both the client data sets and the plurality of endpoints;

train the model to determine an advisory notification based on different sets of client data from the plurality of endpoints;

provide a current state of a client account, determined by communicating with at least one endpoint of the plurality of endpoints of the enterprise system via the communications module, to the model;

use the model, the current state of the client accounts, and a set of rules, to determine the advisory notification to provide to the mobile application for the client account based on the current state of the at least one endpoint;

send, from the adviser engine server, the advisory notification via the mobile application server to a client device to display the advisory notification in the mobile application wherein the mobile application server is associated with the mobile application, wherein the mobile application comprises a portion displaying information associated with the client account and related client accounts, and wherein the advisory notification is displayed separately in a notification card, the notification card being adjacent to, and separate and distinct from the portion displaying information associated with the client account and related client accounts and wherein the model is used to determine whether advisory notifications should be displayed in a particular location in a graphical user interface displayed by the client device instead of another, different location in the graphical user interface.

2. The system of claim 1, wherein the advisory notification comprises at least one option to obtain more information, or to execute an action associated with the advisory notification.

3. The system of claim 2, wherein the computer executable instructions further cause the at least one processor to:

determine that an input has been received in response to the advisory notification; and obtain the more information from one of the at least one endpoint or facilitate execution of the action by communicating with the mobile application or the at least one endpoint.

4. The system of claim 3, wherein facilitating execution of the action comprises communicating with the plurality of endpoints in the enterprise system.

5. The system of claim 1, wherein the computer executable instructions further cause the at least one processor to:

interface the server device with the plurality of endpoints in the enterprise system.

6. The system of claim 5, wherein the computer executable instructions further cause the at least one processor to:

(1) determine that the at least one controlled endpoint comprises data indicative of an executed financial transaction provided by a third party and a service to complete the executed financial transaction is available to the client account from a second endpoint of the plurality of endpoints; and (2) in response to (1), populate the advisory notification with a suggestion to use the service provided by the second endpoint.

7. The system of claim 6, wherein the transaction relates to transferring money.

8. The system of claim 1, wherein the computer executable instructions further cause the at least one processor to:

receive updates from the at least one endpoint to the set of rules; and update the set of rules.

9. The system of claim 1, wherein the set of rules comprises at least one of: i) rules associated with the at least one endpoint, and ii) rules based on user preferences.

10. The system of claim 1, wherein the mobile application enables viewing content with vertical scrolling.

11. A method of providing advisory notifications to mobile applications, the method executed at least in part by a server device and comprising:

interfacing the server device, via a communications module, with a plurality of endpoints each associated with a sub-entity within an enterprise system of a financial institution that provides financial transactions, each endpoint storing client data sets corresponding to client accounts, each client account providing at least one feature in a mobile application for executing financial transactions associated with respective client accounts via corresponding controlled enterprise endpoints;

providing a mobile application server associated with the mobile application;

providing a model in an adviser engine server positioned and operable between a mobile application server associated with the mobile application and the plurality of enterprise endpoints, the model being a machine learning model that is trained by a machine learning engine to automatically determine advisory notifications relevant to the client data sets, the plurality of endpoints, or both the client data sets and the plurality of endpoints;

train the model to determine an advisory notification based on different sets of client data from the plurality of endpoints;

providing a current state of a client account, determined by communicating with at least one controlled endpoint of the plurality of endpoints of the enterprise system, to the model;

using the model, the current state of the client accounts, and a set of rules, to determine the advisory notification to provide to the mobile application for the client account based on the current state of the at least one endpoint;

sending, from the adviser engine server, the advisory notification via the mobile application server to a client device to display the advisory notification in the mobile application, wherein the mobile application comprises a portion displaying information associated with the client account and related client accounts, and wherein the advisory notification is displayed separately in a notification card, the notification card being adjacent to, and separate and distinct from the portion displaying information associated with the client account and related client accounts and wherein the model is used to determine whether advisory notifications should be displayed in a particular location in a graphical user interface displayed by the client device instead of another, different location in the graphical user interface.

12. The method of claim 11, wherein the advisory notification comprises at least one option to obtain more information, or to execute an action associated with the advisory notification.

13. The method of claim 11, further comprising:
determining that an input has been received in response to the advisory notification has been received; and
obtaining the more information from one of the at least one endpoint or facilitating execution of the action by communicating with the mobile application or the at least one endpoint.

14. The method of claim 13, wherein facilitating execution of the action comprises communicating with the plurality of endpoints in the enterprise system.

15. The method of claim 11, further comprising:
interfacing the server device with the plurality of endpoints in the enterprise system.

16. The method of claim 15, further comprising:
(1) determining that the at least one endpoint comprises data indicative of an executed financial transaction provided by a third party and a service to complete the executed financial transaction is available to the client account from a second endpoint of the plurality of endpoints; and
(2) in response to (1), populating the advisory notification with a suggestion to use the service provided by the second endpoint.

17. The method of claim 11, further comprising:
receiving updates from the at least one endpoint to the set of rules; and
updating the set of rules.

18. The method of claim 11, the method further comprising:
receiving updates from the at least one endpoint to the set of rules; and
updating the set of rules.

19. At least one non-transitory computer readable medium for providing advisory notifications to mobile applications, the at least one non-transitory computer readable medium comprising computer executable instructions for:
interfacing at least one server device, via a communications module, with a plurality of endpoints each associated with a sub-entity within an enterprise system of a financial institution that provides financial transactions, each endpoint storing client data sets corresponding to client accounts, each client account providing at least one feature in a mobile application for executing financial transactions associated with respective client accounts via corresponding controlled enterprise endpoints;
providing a mobile application server associated with the mobile application;
providing a model in an adviser engine server positioned and operable between a mobile application server associated with the mobile application and the plurality of enterprise endpoints, the model being a machine learning model that is trained by a machine learning engine to automatically determine advisory notifications relevant to the client data sets, the plurality of endpoints, or both the client data sets and the plurality of endpoints;
train the model to determine an advisory notification based on different sets of client data from the plurality of endpoints;
providing a current state of a client account, determined by communicating with at least one controlled endpoint of the plurality of endpoints of the enterprise system, to the model;
using the model, the current state of the client accounts, and a set of rules, to determine the advisory notification to provide to the mobile application for the client account based on the current state of the at least one endpoint;
sending, from the adviser engine server, the advisory notification via the mobile application server to a client device to display the advisory notification in the mobile application,
wherein the mobile application comprises a portion displaying information associated with the client account and related client accounts, and
wherein the advisory notification is displayed separately in a notification card, the notification card being adjacent to, and separate and distinct from the portion displaying information associated with the client account and related client accounts and wherein the model is used to determine whether advisory notifications should be displayed in a particular location in a graphical user interface displayed by the client device instead of another, different location in the graphical user interface.

20. The at least one non-transitory computer readable medium of claim 19, wherein the instructions are for:
receiving updates from the at least one endpoint to the set of rules; and
updating the set of rules.

* * * * *